United States Patent
Tanimoto

(10) Patent No.: US 6,967,739 B2
(45) Date of Patent: Nov. 22, 2005

(54) FACSIMILE MACHINE AND COMMUNICATION METHOD

(75) Inventor: Yoshifumi Tanimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 922 days.

(21) Appl. No.: 09/733,171

(22) Filed: Dec. 8, 2000

(65) Prior Publication Data

US 2002/0051146 A1 May 2, 2002

(30) Foreign Application Priority Data

Dec. 24, 1999 (JP) .............................. 11-368392

(51) Int. Cl.$^7$ .......................... G06K 15/00; H04N 1/32; H04M 11/00
(52) U.S. Cl. ..................... 358/1.16; 358/1.15; 358/468; 379/100.01; 379/100.09
(58) Field of Search .............................. 358/1.16, 1.15, 358/468, 401, 1.1, 400, 407, 402, 426.02, 440, 444, 474; 379/100.01, 100.09, 88.17, 88.22, 93.01, 93.02, 93.03; 709/245, 206

(56) References Cited

U.S. PATENT DOCUMENTS 5,757,510 A * 5/1998 Okada ........................ 358/402
6,016,386 A * 1/2000 Nosaki et al. .............. 358/1.15
6,301,016 B1 * 10/2001 Matsueda et al. ........... 358/407
6,404,513 B1 * 6/2002 Denker ....................... 358/407

FOREIGN PATENT DOCUMENTS

| JP | 7-95339 | 4/1995 |
| JP | 10-126443 | 5/1998 |
| JP | 11-134266 | 5/1999 |
| JP | 11-136278 | 5/1999 |

* cited by examiner

Primary Examiner—Kimberly Williams
Assistant Examiner—Thomas J. Lett
(74) Attorney, Agent, or Firm—Hogan & Hartson, LLP

(57) ABSTRACT

A facsimile machine connected to PSTN to receive image data from another device over PSTN and transfer the image data to a designated recipient on another network such as LAN and internet. Delivery conditions are registered in a storage of the facsimile machine. Delivery information or instructions are carried together with the image data. A control unit determines a recipient by comparing the delivery information or instructions with the delivery conditions. The control unit causes the facsimile machine to transfer the image data to the determined recipient.

14 Claims, 5 Drawing Sheets

13

| RECEIVING CONDITION | DESTINATION | PRINTING | DELIVERY DAY & TIME |
|---|---|---|---|
| ••• | ••• | ••• | ••• |
| TSI=03 – 4567 – 8901 | A@domain.••• | YES | EVERY DAY FROM 9:00 TO 17:00 |
| ISDN SUB= * 2 | CLIENT B | NO | EVERY WEEK MONDAY THROUGH FRIDAY |
| ••• | ••• | ••• | ••• |
| ACCEPT ALWAYS | C@jimu.••• | NO | EVERY WEEK, MONDAY THROUGH FRIDAY FROM 9:00 TO 17:00 |
| ••• | ••• | ••• | ••• |
| OTHER THAN ABOVE | – | YES | ANY TIME |

FIG. 2

| RECEIVING CONDITION | DESTINATION | PRINTING | DELIVERY DAY & TIME |
|---|---|---|---|
| ... | ... | ... | ... |
| TSI=03-4567-8901 | A@domain.••• | YES | EVERY DAY FROM 9:00 TO 17:00 |
| ISDN SUB=*2 | CLIENT B | NO | EVERY WEEK MONDAY THROUGH FRIDAY |
| ... | ... | ... | ... |
| ACCEPT ALWAYS | C@jimu.••• | NO | EVERY WEEK, MONDAY THROUGH FRIDAY FROM 9:00 TO 17:00 |
| ... | ... | ... | ... |
| OTHER THAN ABOVE | — | YES | ANY TIME |

FACSIMILE MACHINE AND COMMUNICATION METHOD

BACKGROUND OF THE INVENTION

1. Field of the Invention

The present invention relates to facsimile machines connectable to PSTN (Public Switched Telephone Network) and other networks such as LAN, and communication method suitable for such facsimile machines.

2. Description of the Related Art

Recently, facsimile machines that are connectable to not only PSTN but also other networks such as LAN are being developed. Such facsimile machines can perform ordinary facsimile communication over PSTN, which receives and sends data from and to a remote device over PSTN, and another type of facsimile transmission, which receives data from a client machine connected to LAN and transmits it to a recipient over PSTN. This network facsimile machine is also capable of receiving facsimile data from a remote machine over PSTN and transferring it to a client on LAN.

When a network facsimile machine receives image data from a remote machine (transmitting party) over PSTN and transfers it to a client on LAN, it is often impossible for the transmitting party to send an address needed to specify a client on LAN together with the image data. Thus, various information (delivery information or instructions) sent from the transmitting party (or exchange) are associated with addresses of LAN clients beforehand so that a client can be specified based on the delivery information or instructions upon facsimile data reception. After specifying a client, the network facsimile machine transfers the image data to that client.

Conventionally, the delivery information or instructions from the transmitting machine are associated with LAN client addresses in a manner such that a single client is uniquely determined. Therefore, data matching operation to find out a client is required to even a main client who is designated to receive most of the facsimile data. This is troublesome. Further, even less complicated setting is not possible. For example, even if a network facsimile machine wants to transfer facsimile data from a particular remote machine to a client on LAN as well as a client in another section or department of a company, such setting is not feasible. Likewise, even if a network facsimile machine wants to change destination clients depending upon day and time of data reception, such setting is not possible. Thus, flexible use cannot be expected to a conventional network facsimile machine.

SUMMARY OF THE INVENTION

An object of the present invention is to provide a facsimile machine that can overcome the above-described problems.

Another object of the present invention is to provide a communication method suitable for such improved facsimile machine.

According to one aspect of the present invention, there is provided a facsimile machine for receiving facsimile image data together with delivery information or instructions over PSTN or another network such as LAN and internet and transferring the image data to one or more recipients, including a delivery condition storage for registering a plurality of delivery conditions to determine to which recipient(s) the received facsimile image data should be transferred, and a controller for determining recipient(s) of the facsimile image data in accordance with those delivery conditions which match the delivery information of the image data, and for transferring the facsimile image data to the determined recipient(s). The plurality of delivery conditions correspond to a plurality of registered recipients. The delivery conditions may be defined in different terms so that there may be more than one delivery conditions that match the single delivery information sent from the transmitting device. The delivery conditions can include delivery day and time so that the data transfer is carried out in a desired manner. The recipients are changable with day and time of the facsimile image data reception. An additional recipient can be registered by simply inputting an additional delivery condition; it is not necessary to change other delivery conditions in the storage. Accordingly, operation flexibility of the facsimile machine is greatly improved.

When the facsimile machine transfers the image data to a plurality of recipients, the controller may select appropriate protocols so that the data transfer is conducted with different communication protocols which best suit for the respective recipients. Because the protocols are not registered in the delivery condition storage, the content of the delivery conditions is simplified. It is also satisfactory to include a printer of the facsimile machine and/or another printer connected to another network as an additional or alternative recipient. For instance, the data is transferred to the printer and printed out if data transfer to a designated recipient fails. This will prevents the received data from being forgotten.

According to another aspect of the present invention, there is provided a communication method including the steps of causing a facsimile machine to receive image data over PSTN, preparing a list of recipients, to whom the received image data will be transferred from the facsimile machine over another network, based on delivery conditions stored in a storage unit of the facsimile machine, determining whether a flag for causing a printer of the facsimile machine to print the received facsimile image data should be raised based on the delivery conditions, transferring the received facsimile image data to designated recipient(s) based on the list, and causing the printer to print the received facsimile image data based on the flag.

Additional objects, benefits and advantages of the present invention will become apparent to those skilled in the art to which the present invention pertains from the subsequent description of the embodiment and the appended claims, taken in conjunction with the accompanying drawings.

BRIEF DESCRIPTION OF THE SEVERAL VIEWS OF THE DRAWINGS

FIG. 2 illustrates deliver conditions for the facsimile machine shown in FIG. 1 to decide to which device it should transfer image data;

DETAILED DESCRIPTION OF THE INVENTION

An embodiment of the present invention will now be described with reference to the accompanying drawings.

Figure 1:
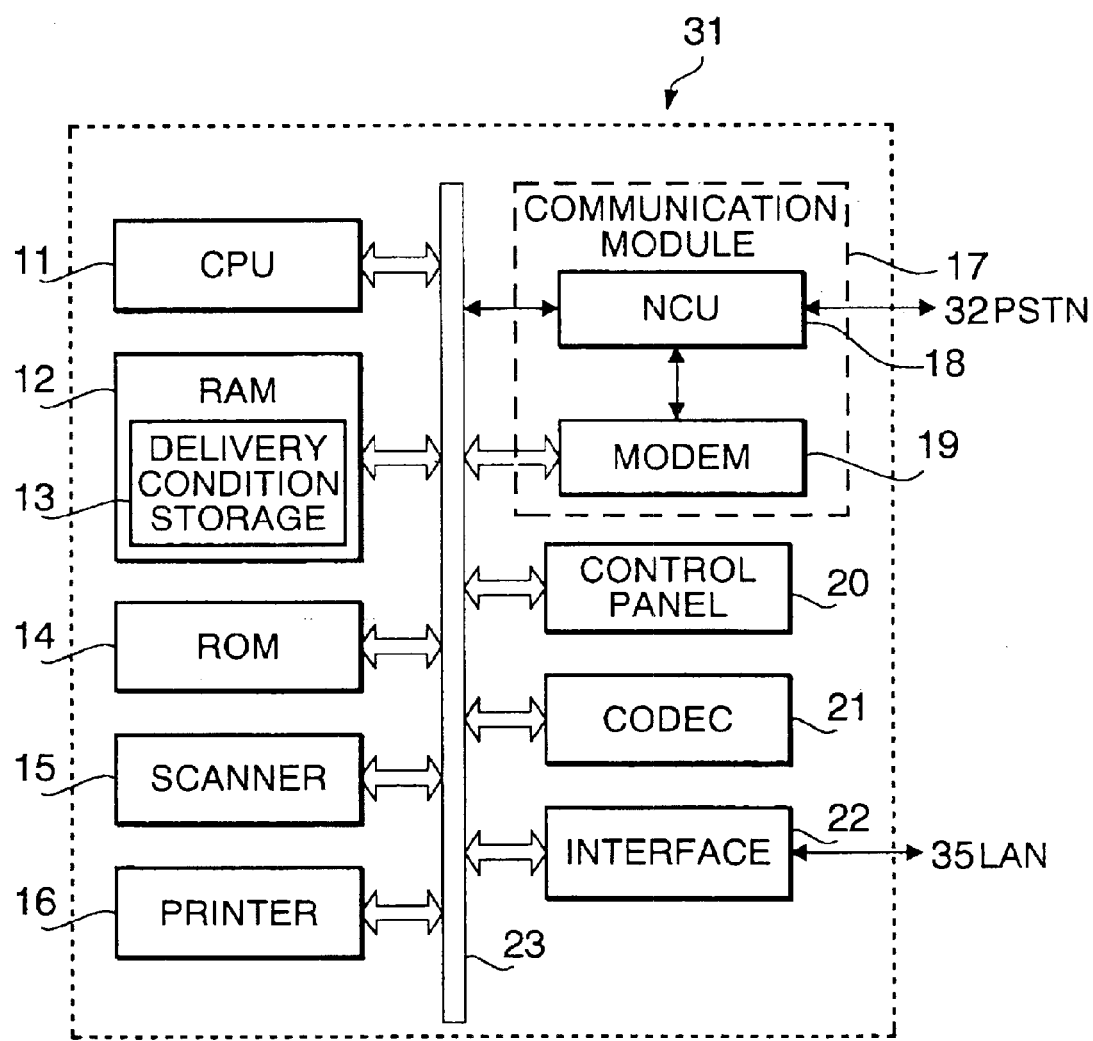
FIG. 1 is a block diagram schematically showing a structure of facsimile machine according to the present invention.

Referring to FIG. 1, illustrated is a facsimile machine 31 that includes a main control unit (CPU) 11, RAM 12, a delivery condition storage 13, ROM 14, a scanner 15, a printer 16, a communication module 17, NCU 18, a modem 19, a control (or operation) panel 20, CODEC (coder-and-decoder) 21, and an interface 22. These hardware elements are connected by a bus 23. NCU 18 and modem 19 are directly connected to each other. NCU 18 is connected to PSTN 32, and the interface 22 is connected to LAN 35. A plurality of clients (FIG. 3) are connected to LAN 35.

The main control unit 11 controls an overall operation of the facsimile machine 31 and causes the respective hardware elements to operate. Under the control of the main controller 11, the communication module 17 sends and receives facsimile image data over PSTN 32, and the interface 22 sends and receives information to and from LAN 35. By using these functions, the facsimile machine 31 can also send data, which is received from LAN 35, to a remote facsimile machine over PSTN 32, and send data, which is received from PSTN 32, to a client on LAN 35. The facsimile machine 31 may also have other functions such as copying.

When the main controller 11 transfers facsimile image data, which is received over PSTN 32, to a client on LAN 35, it checks certain information (delivery information or instructions) sent from a transmitting machine (or exchange) to determine a designated client on LAN 35. In this determination, the main controller 11 refers to delivery conditions registered in the storage 13 to see which client condition matches the delivery information or instructions sent from the transmitting machine. After determining a client, the facsimile machine 31 transfers the image data to that client. It should be noted that there may be more than one matching condition in the storage 13. In such case, the facsimile machine 31 sends the same data to a plurality of recipients.

If the facsimile machine 31 should send the same data to two or more clients on LAN 35 with different protocols, it employs suitable protocols respectively. It should be noted that one of facsimile data recipients may be the printer 16 and/or a printer connected to LAN 35. When the facsimile machine 31 cannot transfer the data to all the recipients or at all, it may cause the printer 16 or LAN printer to print the data. Failure of the data transfer to the clients on LAN 35 may be determined after trying the data transfer several times or after elapse of a predetermined time.

RAM 12 stores data needed to be held for processing of various data in the main controller 11 and other hardware elements. Image data to be transmitted from and received at the communication module 17 and interface 22 may also be stored in RAM 12. It should be noted that another memory may be provided for storing image data to be transmitted and received over PSTN 32 and LAN 35.

RAM 12 has the delivery condition storage 13. A user of the facsimile machine 31 registers various condition data in the storage 13 to determine to which clients on LAN 35 and internet 40 the data should be transferred (delivered) from the facsimile machine 31. A plurality of delivery conditions correspond to a plurality of registered recipients. FIG. 2 illustrates one example of delivery conditions. In this example, reception condition (first column), necessity of printing (third column), and delivery day and time (fourth column) are delivery conditions. Recipient information (second column) is input in accordance with these items.

The reception condition may be prepared to any information possibly sent from a facsimile data transmitting machine (or exchange). For example, the reception condition may specify a transmitting machine number notification and ISDN sub-address sent from the exchange together with (or before) image data, and a transmitting party number, F code sub-address and password which are included in TSI (Transmitting Subscriber Identification) signal during facsimile procedure. If the facsimile machine 31 can receive image data from a plurality of PSTNs, the reception condition may specify PSTN numbers. In the drawing, the reception condition in the second row requires that the delivery information/instructions include a transmitting party number "03-3456-8901", which is carried with TSI signal. The reception condition in the third row requires that ISDN sub-address in the delivery information/instructions is *2. Of course, a user of the facsimile machine 31 can arbitrarily decide the reception condition. For instance, it is satisfactory to use an area code only as the condition instead of a complete telephone number.

Further, the reception condition may include no substantial criteria as indicated in the fifth row in FIG. 2 to accept any data. Moreover, the reception condition may be "any condition other than above (or anything else)" to accept data which does not match the conditions listed thereabove, as indicated by the last row in the illustrated table.

The delivery day and time condition specifies day and time for data transfer. For example, the second row specifies 9:00 a.m. to 5:00 p.m., which is a general office hour. The third row specifies Monday through Friday, which are week days. The fifth row specifies combination of the above two. These conditions may be effective every day and every week through a year, or only a particular day and week. It is also satisfactory to indicate "always" as in the last row, or indicate no delivery time.

The destination (recipient) column may include various data for specification of recipients. For example, an e-mail address is indicated in the second row to transfer image data to a LAN client in the form of e-mail. Alternatively, a salutation user ID may be indicated. If a machine should be specified, IP address may be registered in the condition table. When image data is to be transmitted to another facsimile machine over PSTN 32, a facsimile number may be registered. Of course, recipients may be specified in accordance with communication protocols. Further, a group of recipients may be specified by specifying a domain name only in the destination column. When a plurality of recipients are registered, different protocols may be employed for respective recipients.

"PRINTING," "YES" and "NO" in the third column of the condition table 13 indicate whether or not the received facsimile image data should be printed at the recording device 16 (and/or a printer connected to LAN 35). If a plurality of delivery conditions match the delivery information/instructions, the received image data is printed as long as one of them has a "YES" row. Alternatively, those which have "YES" rows may only be printed. It should also be noted that even if the printing is not requested, the image data may forcibly be printed out when the facsimile machine 31 cannot deliver the image data to a designated recipient.

Preferably, the deliver condition table 13 is defined in RAM 12 at a certain place where the data in the table will not be erased upon power failure.

Referring back to FIG. 1, ROM 14 stores programs needed for the main controller 11 to operate and other fixed data. It should be noted that the delivery condition table 13 may be stored in ROM 14.

The scanner 15 may be an image input device such as image scanner or digital camera and is able to scan image to be transmitted or copied. The printer 16 prints image received at the communication module 17 or interface 22, image scanned for copy, message to a user of the facsimile machine 31, etc. on a recording sheet under the control of CPU 11. The printing may be conducted by electrophotographic technique or inkjet.

The communication module 17 sends and receives image data and other information to and from a remote facsimile machine over PSTN 32 or dedicated line. The communication module 17 may also have a dial up function that enables connection to the internet via PSTN 32 so that the facsimile machine 31 can send and receive data through the internet. The communication module 17 has NCU 18 and modem 19. NCU 18 controls PSTN 32 or dedicated line for communication with a remote facsimile machine. The modem 19 modulates and demodulates data to be sent and received.

The control panel 20 includes a display to indicate various information such as messages to the user, operating conditions of the machine, and operation guidance to the user. The control panel 20 also serves as an input device for the user to input various data, numerals, information and instructions. For instance, the user may operate the control panel 20 to set the delivery conditions to be registered in the table 13 of FIG. 2.

CODEC 21 compresses image data, which is to be sent from the communication module 17 and interface 22, according to a prescribed method and elongates image data, which is received at the communication module 17 and interface 22, to an original form according to an appropriate compression method. It should be noted that this data compression and restoration may be performed by CPU 11, or by combination of CODEC 21 and CPU 11.

The interface 22 is connected to LAN 35 to send and receive various data over LAN 35. LAN 35 may be connected to the internet such that the facsimile machine 31 can communicate with other communication devices such as facsimile machines.

The bus 23 interconnects CPU 11, RAM 12, ROM 14, scanner 15, printer 16, communication module 17 (NCU 18, modem 19), control panel 20, CODEC 21 and interface 22 to enable data communication among these hardware elements. Of course, other devices such as external memories may further be connected to the bus 23.

In the illustrated embodiment, the facsimile machine 31 has the scanner 15 and printer 16 such that it can read in image for facsimile transmission and print image and data received. However, one of the scanner and printer or both of them may be dispensed with.

Figure 3:
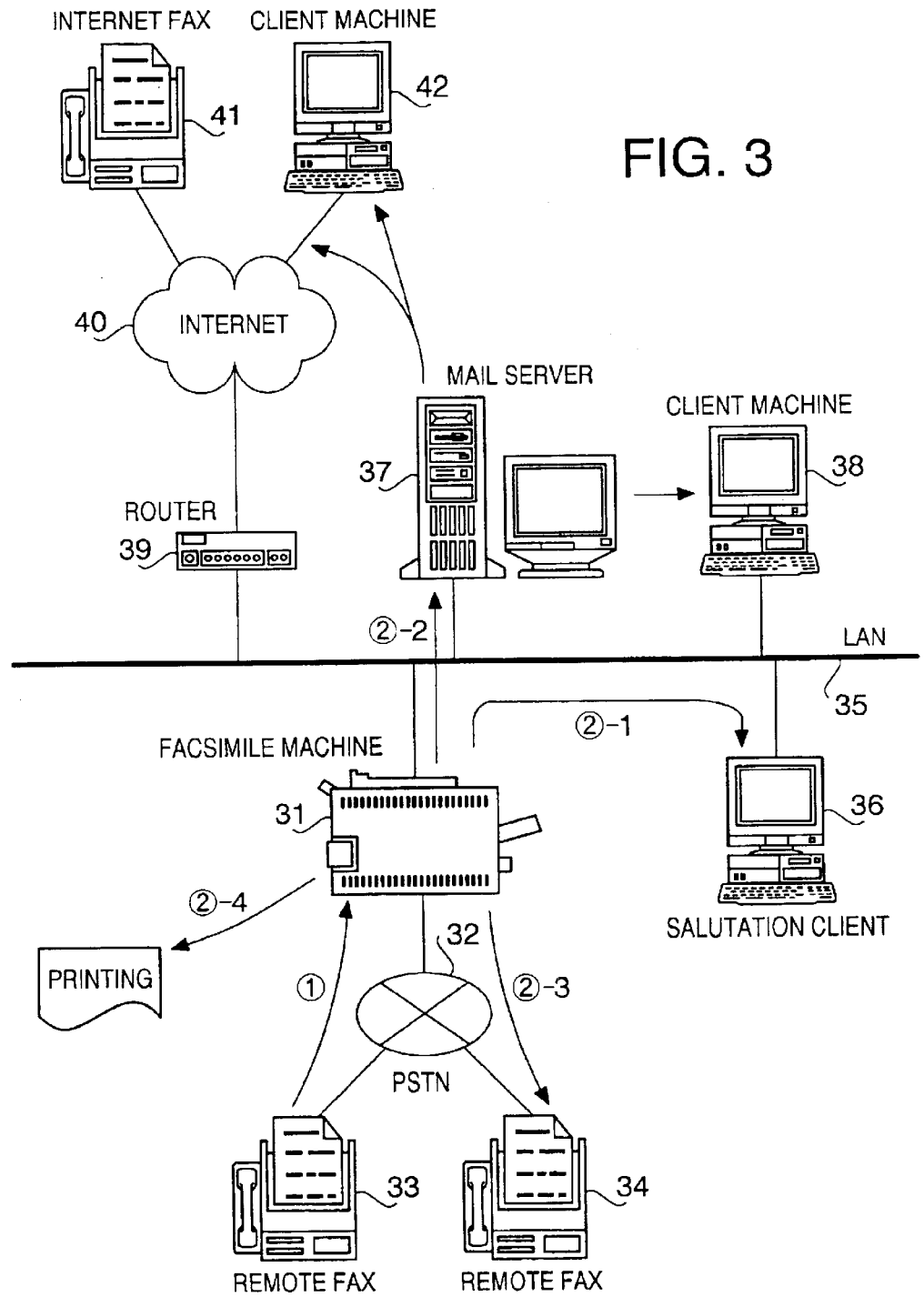
FIG. 3 illustrates a diagram of network including the facsimile machine shown in FIG. 1 connected to LAN and internet.

Referring to FIG. 3, illustrated is a block diagram of network including the facsimile machine 31 described above. Two remote facsimiles 33 and 34 are connected to the facsimile machine 31 of the invention over PSTN 32. A salutation client (terminal device) 36, mail server 37, client machine 38 and router 39 are connected to LAN 35 respectively so that they can communicate with the facsimile machine 31. The internet 40 is connected to LAN 35 via the router 39. To the internet 40, connected are an internet facsimile machine 41 and internet client machine 42.

The facsimile machine 31 can send and receive facsimile data to and from the remote facsimile machines 33 and 34 over PSTN 32.

A plurality of client machines such as salutation client 36 and client machine 38 are connected to LAN 35. The salutation client 36 is a client machine that can communicate with the facsimile machine 31 under the salutation protocol. In this embodiment, the client machine 38 has an e-mail function by SMTP (Simple Mail Transfer Protocol) and POP3 (Post Office Protocol 3). In the illustrated network structure, the facsimile machine 31 functions as a facsimile server.

The single salutation client 36 and single client machine 38 are illustrated, but they may be more than one respectively. Alternatively, one of them may be dispensed with. Likewise, a plurality of mail server 37 may be attached to LAN 35 or no mail server 37 may be provided. Further, other servers and network devices may also be connected to LAN 35.

The facsimile machine 31 may also be connected to another LAN via the router 39.

When the remote facsimile machine 33 transmits image data to the facsimile machine 31 via PSTN 32 as indicated by the line ①, the facsimile machine 31 refers to the delivery condition table 13 to determine if there is a matching condition, based on the delivery information/instructions sent from the remote facsimile machine 33 or exchange. If there is a matching between the registered delivery condition and the received delivery information/instructions, and a recipient (destination) is determined, the facsimile machine 31 transfers the image data, which is received from the remote facsimile machine 33, to the recipient.

If the recipient is the salutation client 36, the facsimile machine 31 transmits the data to the salutation client 36 by the salutation protocol as indicated by the line ②-1.

If the data specifying a recipient is an e-mail address (see FIG. 2, second column), the facsimile machine 31 receives the data and transmits it in the form of e-mail to the mail server 37 by SMTP, for instance, as indicated by the line ②-2. If it belongs to the same domain, a user of the client machine 38 accesses the mail server 37 to retrieve the e-mail by POP3, for example. If the domain name of the e-mail address is not the same, the mail server 37 transmits the e-mail to another mail server connected to the internet 40 via the router 39.

If the recipient information is a facsimile number of, for example, the other remote facsimile machine 34, the data from the remote facsimile machine 33 is sent to the facsimile machine 34 over PSTN as indicated by the line ②-3.

If the printing is requested, or the printing is not requested but the data transmission to a designated recipient fails, the facsimile machine 31 causes its printer 16 to print the data as indicated by the line ②-4.

It should be noted that the data delivery destination may be more than one. Based on the delivery information/instructions included or carried with the image data from the transmitting facsimile machine 33, a plurality of destinations may be specified and the data may be transferred to them according to respective routes and protocols.

Prior to facsimile data transfer, the delivery conditions should be registered in the storage 13. In this embodiment, as illustrated in FIG. 2, the delivery conditions are reception condition, destination, necessity of printing, and delivery day and time. These conditions may be input by a user who operates the control panel 20, or from a remote device through the communication module 17 or interface 22.

Unlike the conventional arrangement, it is not necessary to specify the delivery conditions for the respective rows in the table 13 of FIG. 2. For instance, the destinations may be categorized into a main recipient(s) and others. Additional delivery conditions may also be registerable into the table 13. In the illustrated embodiment, the conditions can be set in accordance with information carried with the image data from the transmitting machine or exchange so that operation flexibility of the facsimile machine 31 is improved.

Figure 4:
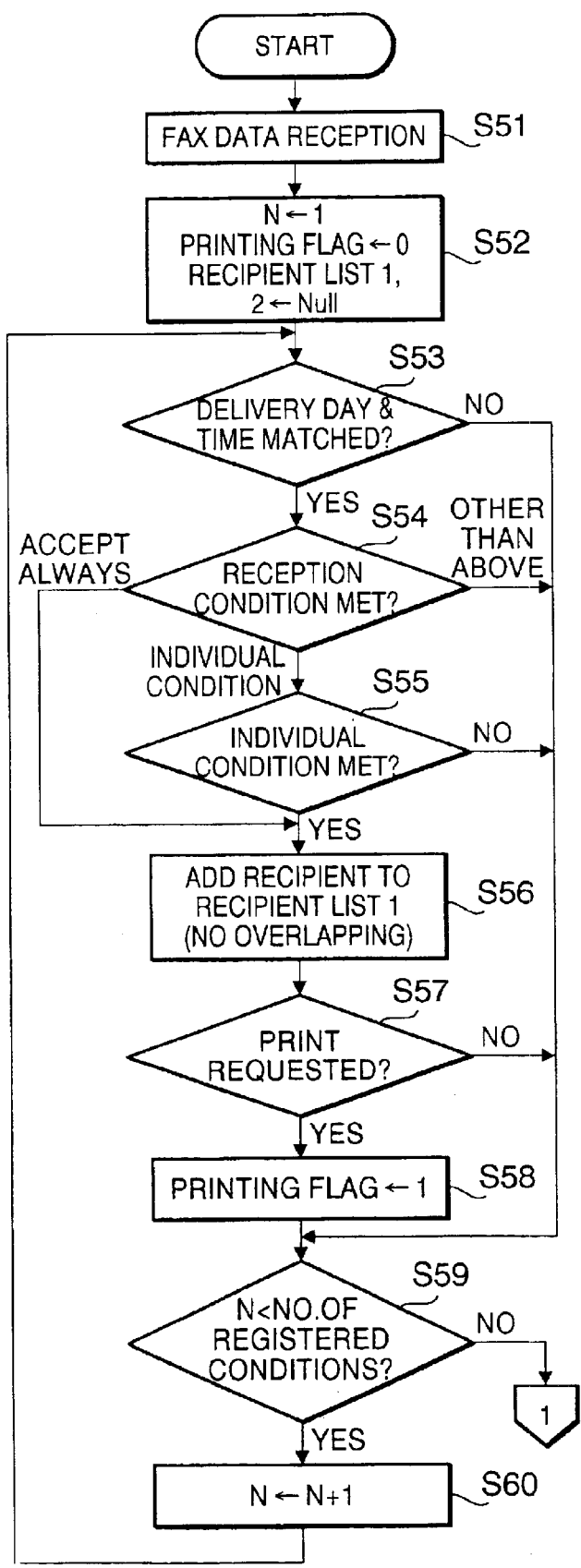
FIGS. 4 and 5 illustrate in combination a flowchart for the facsimile machine shown in FIG. 1 when it receives image data from another device.
Figure 5:
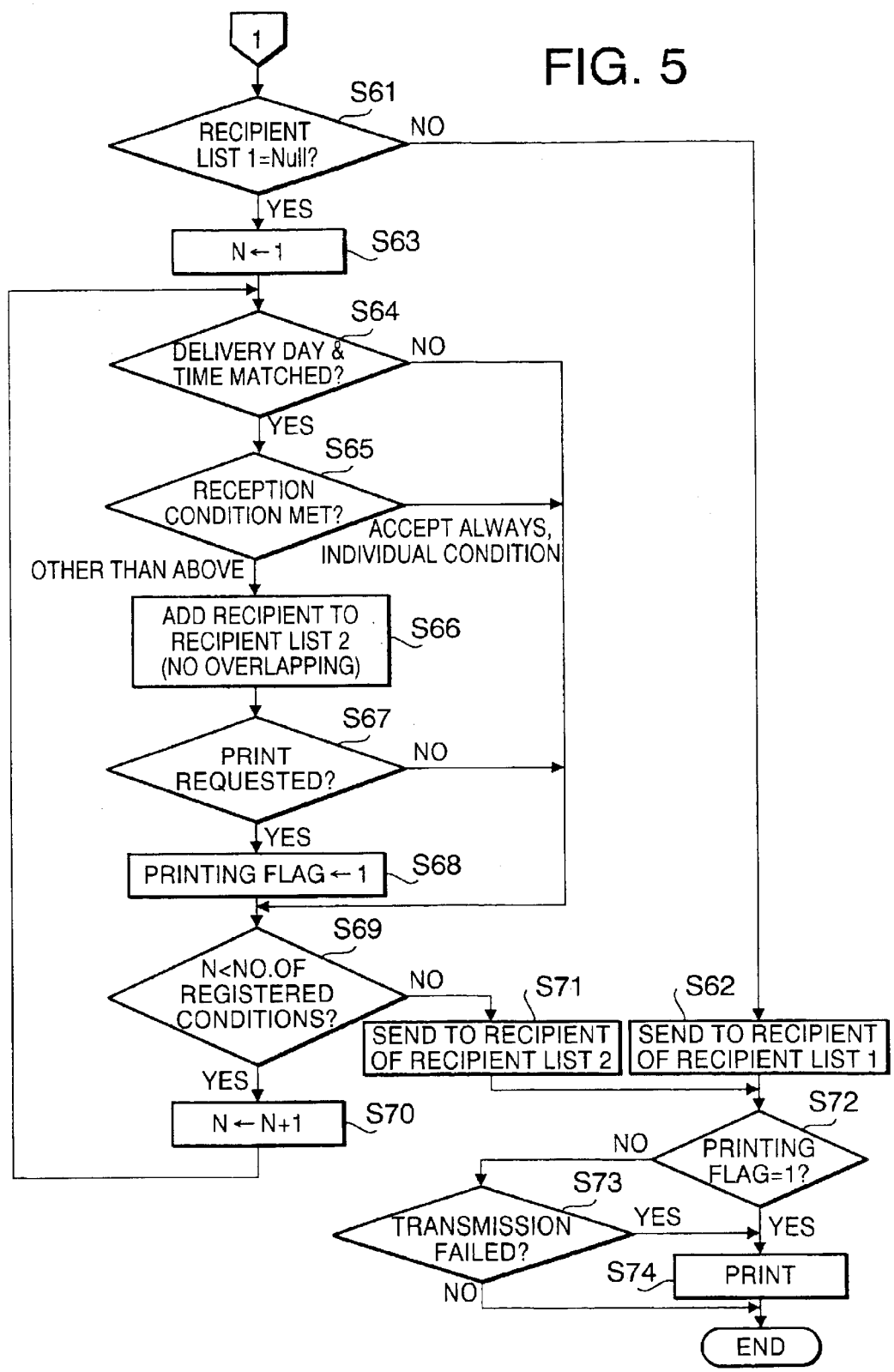

FIGS. 4 and 5 illustrate in combination a flowchart of one concrete example of procedures performed by the facsimile machine 31. It should be assumed that the delivery conditions are already registered in the table 13 and the facsimile machine 31 receives image data.

At S51, the facsimile machine 31 receives image data from another facsimile machine over PSTN. At S52, initial setting is performed. Here, a variable N for condition checking counting is set to 1, a printing flag is set to zero (becomes 1 if printing is requested), and recipient list areas 1 and 2 are made vacant (null). When N=1, the first row in the table 13 of FIG. 2 is compared with the delivery information/instructions of the received image data.

After the initial setting, it is determined at S53 whether the current day and time matches the delivery day and time registered in the fourth column of the table 13. If not, the program proceeds to S59.

If the answer at S53 is yes, the reception condition is checked at S54. If the first column of the condition table 13 indicates "ACCEPT ALWAYS," the program proceeds to S56, and a designated recipient is put into the recipient list area 1. It should be noted that if the same recipient is already present in the recipient list area, this recipient is not repeatedly input to the recipient list area. On the other hand, if the reception condition given from the transmitting machine does not match that registered in the table 13, the program proceeds to S59 from S54. In the flowchart, it is represented by "OTHER THAN ABOVE."

If the registered reception condition is neither "ACCEPTS ALWAYS" nor "OTHER THAN ABOVE," it is an individual condition, and it is determined whether the delivery information/instructions of the image data matches the registered individual condition at S55. If the individual condition registered in the table 13 does not match the reception condition carried with the incoming image data, the program proceeds to S59. However, if they match, a designated recipient is put into the recipient list area 1. It should be noted that when the same recipient already exists in the recipient list area 1, it is not input.

Subsequent to S56, it is determined whether the information associated with the received image data requests the printing at S57. If the printing is requested, the printing flag is raised to 1 at S58.

Then, the variable N is compared with the number of registered delivery conditions (the number of rows in the table 13). If the former is smaller than the latter, one is added to the current N at S60 and the program returns to S53 to repeat the same process to the next row in the table 13. It should be noted that the number of delivery conditions may be a maximum number registerable in the table 13, and the table 13 may include vacant rows. When these vacant rows are used in the flowchart of FIG. 4, the answer at S53 is always negative.

When the variable N becomes the number of registered delivery conditions, i.e., all the delivery conditions of the table 13 are checked, it is then determined whether there is a recipient in the recipient list area 1 or null at S61 as illustrated in FIG. 5. If the recipient list area 1 is occupied, the facsimile machine 31 transfers the image data, which is received at S51, to that or those recipients at S62.

If the recipient list area 1 is vacant (null) at S61, the procedure from S63 to S71 is executed as long as the delivery condition table 13 includes "OTHER THAN ABOVE" for reception condition. Specifically, the variable N is reset to 1 at S63 and the delivery day and time are checked at S64. If the current day and time do not match the day and time specified in the first row of the table 13, the program advances to S69. On the other hand, if they match, it is then determined whether the reception condition matches at S65. If the reception condition of the image data does not coincide with that registered in the first row of the table 13, the program advances to S66. It is represented by "OTHER THAN ABOVE" in the flowchart. If the registered reception condition is "ACCEPT ALWAYS" or the reception condition of the image data coincides with the registered individual condition, the program proceeds to S69.

At S66, a recipient is added to the recipient list 2. It should be noted that the same recipient is not repeatedly added to the list 2.

Then, it is determined at S67 whether the printing is requested or not. If requested, the printing flag is set to 1 at S68.

After that, the variable N is compared with the number of registered conditions. If the former is smaller than the latter, the program proceeds to S70 to add 1 to the current N, and returns to S64 to check the next row of condition. The number of registered conditions in S69 is the same as S59.

If N becomes equal to the number of registered conditions, the facsimile machine 31 transfers the image data to the recipient(s) of the list 2. The image data is the one received at S51.

In the foregoing, the process from S63 to S70 is executed to find recipients who match "OTHER THAN ABOVE." Alternatively, when the reception condition of "OTHER THAN ABOVE" is met at S54, that recipient may be picked up.

The image data transmission at S62 and S71 are performed in accordance with protocols suited for respective recipients. For example, the facsimile machine 31 sends the image data over LAN 35 by the salutation protocol, transmits it in the form of e-mail by SMTP and via facsimile over PSTN 32 as shown in FIG. 3.

After S62 or S71, the print flag is checked at S72. If the flag is 1, the facsimile data is printed from the printer 16 at S74. If the flag is 0, it is the determined whether there is a recipient who should have received the image data at S73. If the data transmission fails for a certain recipient, the data is printed from the printer at S74. Transmission failure is determined if no response is received from a recipient after a predetermined period, or if transmission is tried repeatedly for several times.

The above described and illustrated facsimile machine and communication method are disclosed in Japanese Patent Application No. 11-368392 filed in JPO on Dec. 24, 1999, and the subject application claims the priority of these Japanese Patent Application, the entire disclosure of which is incorporated herein by reference.

What is claimed is:

1. A facsimile machine connectable to PSTN and other networks, comprising:

a delivery condition storage for registering a plurality of delivery conditions to determine to which recipient from a list of recipients facsimile image data should be transferred, the facsimile image data being received from another device over PSTN or other networks, and delivery information or instructions being carried together with the facsimile image data, wherein the delivery condition storage searches the list of recipients for the recipient and adds the recipient to the list if the recipient is not on the list of recipients; and a control unit for determining one or more recipients of the facsimile image data in accordance with one or more delivery conditions that match the delivery information or instructions of the facsimile image data, and for transferring the facsimile image data to the determined one or more recipients.

2. The facsimile machine of claim 1, wherein the control unit transfers the facsimile image data to the determined one or more recipients in accordance with protocols suitable to the respective recipients.

3. The facsimile machine of claim 1, wherein the delivery conditions include day and time of data transfer.

4. The facsimile machine of claim 1, wherein the control unit transfers the facsimile image data to a printer associated with the facsimile machine or another printer connected to the other networks when data delivery to at least one of the determined one or more recipients fails.

5. The facsimile machine of claim 1, wherein the recipients include a client machine connected to the other networks.

6. The facsimile machine of claim 1, wherein the recipients include a client machine connected to the other networks via the internet.

7. The facsimile machine of claim 1, wherein the recipients include a facsimile machine connected to the other networks via the internet.

8. A facsimile communication method comprising the steps of:
   A) receiving facsimile image data over PSTN at a facsimile machine;
   B) preparing a list of one or more recipients, to whom the received facsimile image data will be transferred from the facsimile machine over another network, based on delivery conditions stored in a storage unit of the facsimile machine, and further determining whether a flag for causing a printer of the facsimile machine to print the received facsimile image data should be raised based on the delivery conditions;
   C) transferring the received facsimile image data based on the list; and
   D) causing the printer to print the received facsimile image data based on the flag.

9. The facsimile communication method of claim 8, wherein the step B includes the sub-steps of:
   B-1) adding a recipient to a first area in the list when a reception condition of the delivery conditions is accepting the facsimile image data always or delivery information or instructions carried together with the received facsimile image data match an individual reception condition, and further determining whether the flag should be raised or not; and
   B-2) adding a recipient to a second area in the list when the reception condition is not accepting the facsimile image data always and the delivery information or instructions do not match the individual reception condition but the reception condition is accepting the facsimile image data in any condition, and further determining whether the flag should be raised or not, and wherein
   the received facsimile image data is transferred to recipients of the first and second areas of the list in the step C.

10. The facsimile communication method of claim 8, wherein the flag is raised when data transfer to recipients fails.

11. The facsimile communication method of claim 8, wherein the another network includes at least one of LAN and internet.

12. The facsimile communication method of claim 8, wherein the delivery conditions include day and time of data transfer.

13. The facsimile communication method of claim 8 further including the step of causing a second printer connected to the another network to print the received image data if data transfer to recipients fails.

14. The facsimile communication method of claim 8, wherein the received image data is transferred in the form of e-mail.

* * * * *